US012540068B2

(12) United States Patent
Yamashita et al.

(10) Patent No.: US 12,540,068 B2
(45) Date of Patent: Feb. 3, 2026

(54) LIQUID SUPPLY SYSTEM

(71) Applicants: Asahi Group Holdings, Ltd., Tokyo (JP); ASAHI BREWERIES, LTD., Tokyo (JP)

(72) Inventors: Naoyuki Yamashita, Moriya (JP); Junichi Kitano, Moriya (JP); Takashi Wada, Kobe (JP); Kenji Kusunoki, Kobe (JP); Takashi Nishio, Kobe (JP)

(73) Assignees: ASAHI GROUP HOLDINGS, LTD., Tokyo (JP); ASAHI BREWERIES, LTD., Tokyo (JP)

( * ) Notice: Subject to any disclaimer, the term of this patent is extended or adjusted under 35 U.S.C. 154(b) by 463 days.

(21) Appl. No.: 18/029,504

(22) PCT Filed: Jul. 28, 2021

(86) PCT No.: PCT/JP2021/027909

§ 371 (c)(1),
(2) Date: Mar. 30, 2023

(87) PCT Pub. No.: WO2022/070576

PCT Pub. Date: Apr. 7, 2022

(65) Prior Publication Data

US 2023/0365394 A1 Nov. 16, 2023

(30) Foreign Application Priority Data

Oct. 1, 2020 (JP) ................................ 2020-167092

(51) Int. Cl.
*B67D 1/12* (2006.01)
*B08B 9/032* (2006.01)
(Continued)

(52) U.S. Cl.
CPC ............ *B67D 1/125* (2013.01); *B08B 9/0325* (2013.01); *B08B 9/0328* (2013.01); *B67D 1/04* (2013.01);
(Continued)

(58) Field of Classification Search
CPC . B67D 1/125; B67D 1/04; B67D 1/07; B67D 1/1247; B67D 2001/075;
(Continued)

(56) References Cited

U.S. PATENT DOCUMENTS 3,878,970 A 4/1975 Nezworski
5,674,323 A * 10/1997 Garcia .................. B08B 9/0325 134/22.12

(Continued)

FOREIGN PATENT DOCUMENTS

EP 0587344 A1 3/1994
EP 3 162 757 A1 5/2017

(Continued)

OTHER PUBLICATIONS

International Search Report, issued in PCT/JP2021/027909, PCT/ISA/210, dated Sep. 14, 2021.

(Continued)

*Primary Examiner* — Michael Collins
(74) *Attorney, Agent, or Firm* — Birch, Stewart, Kolasch & Birch, LLP

(57) ABSTRACT

Provided is a liquid supply system with which it is possible to perform quality control of a liquid provided by the system. A liquid supply system (101) that pumps a liquid in a storage container (10) through a supply tube (30) and dispenses the liquid from a liquid dispensing spout of a dispensing device (50), said liquid supply system (101) comprising: a jetting prevention device (110) that has a liquid inlet (111), a liquid outlet (112), and a float (116) for
(Continued)

closing the liquid outlet due to inflow of air from the liquid inlet, thereby preventing jetting of pressurized air from the liquid dispensing spout, and provides cleaning or no cleaning inside of a conduit in the liquid supply system; a liquid absence detection device (120) that has a no-liquid/liquid passing sensor (122) for detecting that the liquid in the storage container is gone, and sends empty storage container information; and a transmission device (130) that has a control unit (131) for carrying out control of information transmission to a communication line (200).

4 Claims, 4 Drawing Sheets

(51) Int. Cl.
*B67D 1/04* (2006.01)
*B67D 1/07* (2006.01)

(52) U.S. Cl.
CPC ............ *B67D 1/07* (2013.01); *B67D 1/1247* (2013.01); *B08B 2209/032* (2013.01); *B67D 2001/075* (2013.01)

(58) Field of Classification Search
CPC ........ B67D 2210/00089; B67D 1/0406; B67D 1/0864; B08B 9/0325; B08B 9/0328; B08B 2209/032
See application file for complete search history.

(56) References Cited

U.S. PATENT DOCUMENTS

| | | | | |
|---|---|---|---|---|
| 11,161,729 | B2 * | 11/2021 | Volftsun | B67D 1/0878 |
| 11,718,515 | B2 * | 8/2023 | Yamashita | B67D 1/07 222/400.7 |
| 2010/0282334 | A1 * | 11/2010 | Hartmann | B67D 1/1272 137/170.2 |
| 2020/0055720 | A1 | 2/2020 | Volftsun et al. | |
| 2020/0339408 | A1 | 10/2020 | Yamashita et al. | |

FOREIGN PATENT DOCUMENTS

| | | | |
|---|---|---|---|
| JP | 2003-261200 | A | 9/2003 |
| JP | 2004-203452 | A | 7/2004 |
| JP | 2019-94085 | A | 6/2019 |
| WO | WO 2007/053665 | A2 | 5/2007 |

OTHER PUBLICATIONS

Written Opinion of the International Searching Authority, issued in PCT/JP2021/027909, PCT/ISA/237, dated Sep. 14, 2021.
English translation of International Preliminary Report on Patentability and Written Opinion of the International Searching Authority for International Application No. PCT/JP2021/027909, dated Apr. 13, 2023.
Extended European Search Report for European Application No. 21874880.4, dated Sep. 30; 2024.

* cited by examiner

LIQUID SUPPLY SYSTEM

TECHNICAL FIELD

This invention relates to a liquid supply system for pumping liquid from a storage container and dispensing it through a dispensing device into a drinking vessel. In particular, this invention relates to a liquid supply system that has a mechanism to prevent liquid from spurting out of said liquid supply system and that enables quality control of the supplied liquid.

BACKGROUND

Liquid supply systems are commonly used in restaurants as an equipment for serving liquids, such as beer. Referring to FIG. 5 and taking beer as an example, the liquid supply system 70 has a carbon dioxide gas cylinder 15 as a pressurization source, a beer keg 10 filled with beer, a supply tube 30, and a beer dispenser 50, whereby the beer in the beer keg 10 is pressurized with carbon dioxide gas from the carbon dioxide gas cylinder 15 and pumped through the supply tube 30 to the beer dispenser 50. The beer dispenser 50 has a beer cooling tube 52 installed in a cooling tank 51, a refrigerator 53, and a liquid outlet 54. The refrigerator 53 freezes a part of water in the cooling tank 51. Then, an operation of the lever provided at the liquid outlet 54 allows the beer to be supplied through the beer cooling tube as it is cooled and finally dispensed into the drinking vessel such as mug. The beer in the beer keg is so served to customers.

PRIOR ART DOCUMENT

Patent Document

Patent Document 1: JP 2003-261200 A

SUMMARY OF THE INVENTION

Problems to be Solved by the Invention

In the liquid supply system 70 as described above, for example, if the beer in the beer keg 10 runs out as it is being dispensed from the liquid outlet 54, the carbon dioxide gas pumping the beer may blow out from the liquid outlet 54, splashing the beer out of the mug. To prevent such blowouts, several blowout prevention devices 60 have been proposed and used, which electrically or mechanically detect when the beer in the beer keg runs out and stop the dispensing operation. Typically, these blowout prevention devices 60 are installed in the tube connecting between the outlet of the beer keg 10 and the inlet of the beer dispenser 50.

The quality of beer supplied to the customers by means of liquid dispensing system 70 with the blowout prevention device 60, i.e., whether customers taste good when drinking the beer supplied, much depends on "beer freshness" and "cleanness of tube".

Beer freshness is the most important factor that determines the quality of the beer, and a deterioration of the beer starts with the opening of the beer keg. This means that the beer freshness is affected by how many days have passed from the opening of the beer keg. A beer keg storing temperature (i.e., temperature of beer in the keg) is also an important factor. Therefore, beer manufactures recommend that the beer be completely consumed within three days from the opening of the keg and be stored at a temperature less than 30 degrees Celsius.

Tube cleanliness affects the number of unwanted bacteria in the dispensing beer and also the taste of the beer. Therefore, beer manufactures recommend that interiors of the tubes be washed with water every day after closing the restaurant and also washed with sponge once a week.

Actually, however, even in the liquid dispensing system 70 with the blowout prevention device 60 mechanically detecting the runout of the beer in the beer keg, there remains some possibility that beer freshness or tube cleanness and, as a result, the quality of the beer dispensed are taken lightly.

The present invention is to solve such problems, and an object of the present invention is to provide a liquid supply system capable of well controlling the quality of liquid dispensed.

Means for Solving the Problems

To achieve the above object, an embodiment according to the invention is a liquid supply system that supplies liquid, using pressurized gas, from a storage container to a dispensing device through a supply tube and dispenses the liquid from a liquid outlet of the dispensing device into a drinking vessel, the liquid supply system comprising:

- a blowout prevention device that is installed in the supply tube, the blowout prevention device including
  - a liquid inlet connected to the supply tube,
  - a liquid outlet connected to the supply tube, and
  - a float configured to fit in and close the liquid outlet by an inflow of gas from the liquid inlet and thereby prevent the pressurized gas from blowing out from the liquid outlet,
  - the blowout prevention device providing information indicative of that a cleaning of an inside of a pipe in the liquid supply system has been done;
- a liquid absence detection device that is installed between the storage container and the blowout prevention device or in the blowout prevention device, the liquid absence detection device including a no-liquid/liquid passage sensor that detects that liquid in the storage container has run out and sends storage container empty information; and
- a transmission device that is electrically connected to the liquid absence detection device, and includes a control unit that performs control of information transmission to a communication line.

Effects of the Invention

According to one aspect of the invention, the system includes the liquid absence detection device and the transmission device. The transmission device can transmit at least information, from the liquid absence detection device, indicative of that liquid in the storage container has run out and information, obtained secondarily from the above information, indicative of that the cleaning of the inside of the pipe in the liquid supply system has been done. Therefore, for example, a beer manufacture can acknowledge how many days have passed from the opening of the storage container (for example, a beer keg), and whether the cleaning of the inside of the pipe has been done. Therefore, it is possible to control the quality of liquid to be provided.

EMBODIMENTS OF THE INVENTION

Figure 1:
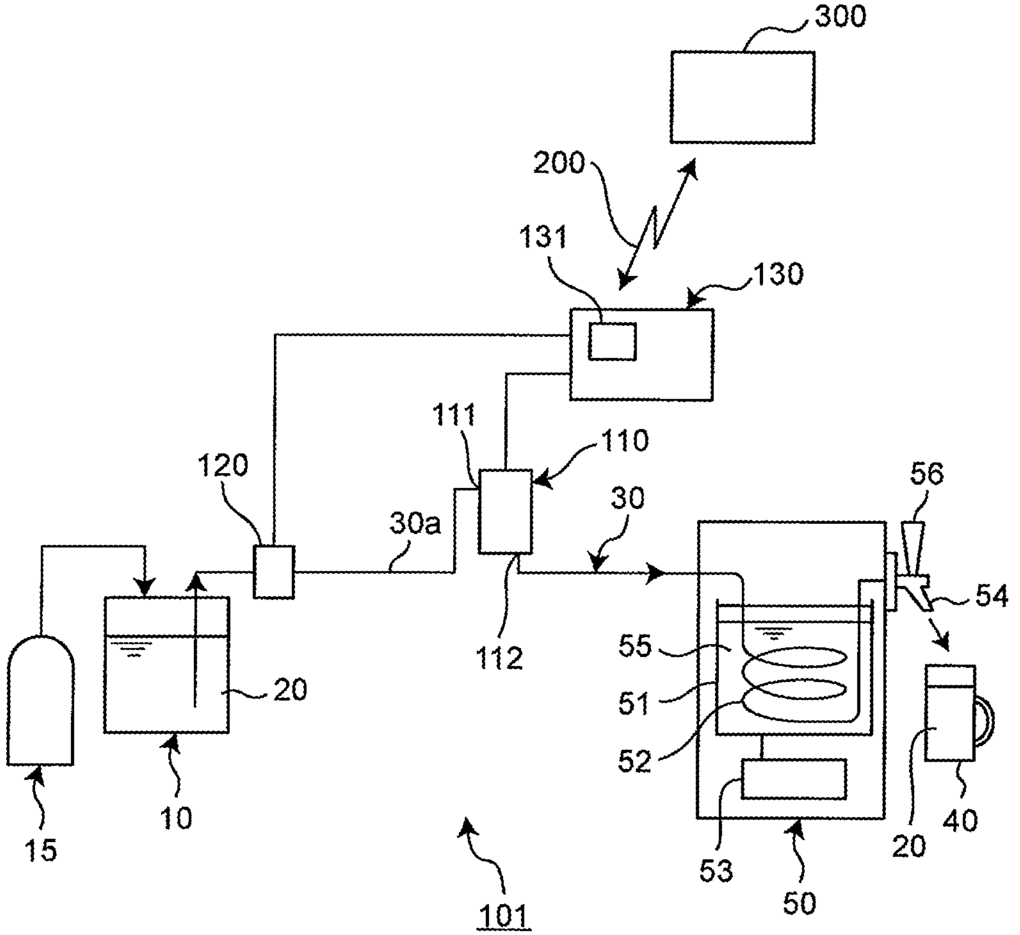
FIG. 1 is a diagram showing an exemplary configuration a liquid supply system according to an aspect of the present invention.

A liquid supply system that is an embodiment of the present invention and a liquid loss reduction method implemented in the liquid supply system will be described below with reference to drawings. It is noted that in the respective drawings, the same or similar component is assigned the same reference numeral. Furthermore, to prevent the following description from being unnecessarily redundant and to facilitate understanding of those skilled in the art, detailed description of already well-known matters and repeated description of the substantially same configuration may be omitted. Moreover, contents of the following description and the accompanying drawings are not intended to limit the subject described in claims.

In the embodiment described below, beer is taken as an example of liquid to be dispensed; however, the liquid is not limited to beer, and may be alcoholic beverages such as low-malt beer, liqueur, shochu cocktails, whiskey, and wine, drinking water, refreshing beverages, carbonated beverages, etc.

A liquid supply system 101 in the embodiment shown in FIG. 1 will be described. The liquid supply system 101 has a configuration that is based on the liquid supply system 70 described previously with reference to FIG. 5 and is added with some components as described below.

That is, as shown in FIG. 1, the liquid supply system 101 has a configuration that is based on existing components including the beer keg 10, a pressurization source 15, the supply tube 30, and a dispensing device 50 and is added with a new blowout prevention device 110 instead of the above-described blowout prevention device 60, a liquid absence detection device 120, and a transmission device 130.

It is noted that FIG. 1 is a diagram showing a schematic configuration in the embodiment; however, a basic configuration of the liquid supply system 101 does not include a communication line 200 and a host computer 300. Furthermore, in the basic configuration of the liquid supply system 101, the blowout prevention device 110 does not have to be electrically connected to the transmission device 130.

Moreover, in the present specification, "electrically connected" means a concept that is not limited to wired connection and includes wireless connection as well.

The respective components are described below in sequence.

First, as described earlier, the existing components are a system in which liquid (beer in the embodiment as described above) 20 in a storage container 10 is supplied by pressurization by the pressurization source 15, i.e., is pressure-fed into the dispensing device 50 through the supply tube 30 and is dispensed from the dispensing device 50 into a drinking vessel (for example, a mug) 40. The storage container 10 here is, in the embodiment, a stainless container called beer keg filled with beer by a beer brewery, and has a capacity of, for example, 5 liters, 10 liters, or 19 liters. The pressurization source 15 is a carbon dioxide cylinder. The supply tube 30 is a resin tube made of, for example, polyamide, polyurethane, polyester, or the like having flexibility, which allows beer to pass between the storage container 10 and the dispensing device 50. Furthermore, the inner diameter of a fluid passage is preferably designed to be the same in dimension from the supply tube 30 to the liquid outlet 54 of the dispensing device 50 except for the blowout prevention device 110.

As an example of the above-described dispensing device 50, a beer dispenser (sometimes referred to as a "beer server") is described as an example in the present embodiment (therefore, below, it may be referred to as the beer dispenser 50). As previously described above, the beer dispenser 50 includes a liquid cooling tube (the beer cooling tube 52 in the embodiment) installed in the cooling pool 51, the refrigerator 53, and the liquid outlet 54, and freezes a portion of cooling water 55 in the cooling pool 51 by means of the refrigerator 53 and cools the liquid (the beer) 20 passing through the beer cooling tube 52 with the cooling water 55. Through manipulation of a lever 56 on the liquid outlet 54, the beer 20 pressure-fed with carbon dioxide of the pressurization source 15 passes through the beer cooling tube 52 and thereby is cooled, and is dispensed into a drinking vessel 40, for example, a mug or the like, and then is provided to a customer.

It is noted that in general, the beer dispenser 50 is used in an environment where the outside air temperature is not less than 5° C. and not more than 40° C. Furthermore, liquid handled by the dispensing device 50 is not limited to beer, and may be drinking water, etc. described above. Moreover, in the embodiment, the beer dispenser 50 cools beer that is target liquid; however, the dispensing device 50 included in the embodiment may heat target liquid or keep it hot.

Figure 2:
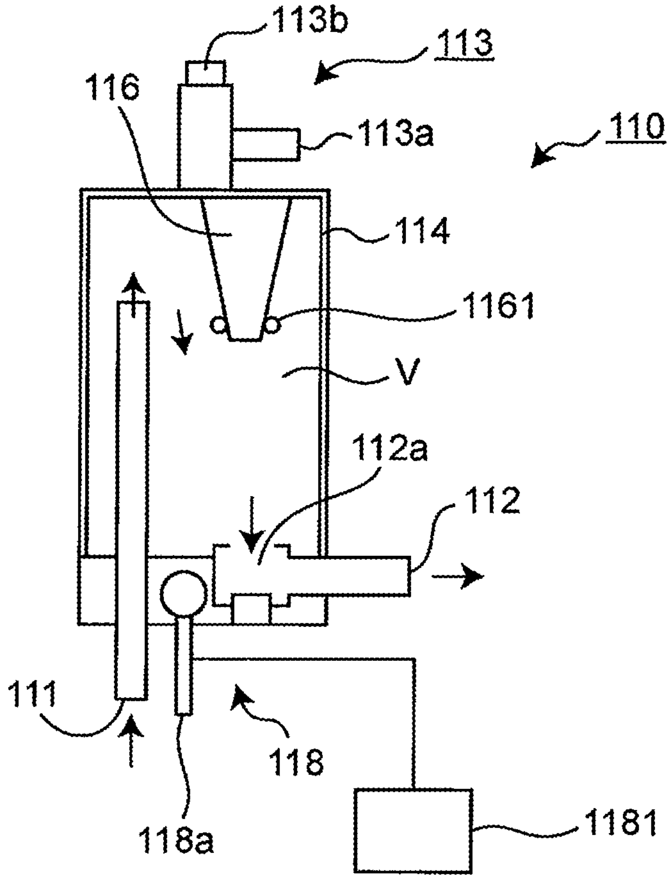
FIG. 2 is a diagram showing a schematic configuration of a blowout prevention device shown in FIG. 1.

Next, the blowout prevention device 110 is an alternative for the blowout prevention device 60 described with reference to FIG. 5, and, as shown in FIGS. 1 and 2, is installed in the supply tube 30, and has a tubular shape, for example, a circular cylinder, a square tube, or the like with a prescribed internal volume V, and is provided with a liquid inlet 111 connected to the supply tube 30 and a liquid outlet 112 connected to the supply tube 30. It is noted that the internal volume V is, for example, 100 cc when the pressure of pressurized gas (carbon dioxide in the present embodiment) is 0.4 MPa.

Such a blowout prevention device 110 is a device that, for example, in a case where beer in the beer keg 10 has run out, i.e., the beer keg 10 has become empty while beer is dispensed from the liquid outlet 54, prevents carbon dioxide with which the beer has been pressure-fed from blowing out from the liquid outlet 54 and also provides information that cleaning of the inside of the pipe in the liquid supply system 101 is done. Although details of this point will be described later in description of the operation, the blowout prevention device 110 acts as kind of a buffer that prevents carbon dioxide flown from the liquid inlet 111 into the blowout prevention device 110 from flowing out of the liquid outlet 112 directly to the side of the dispensing device 50.

To perform such a function, the blowout prevention device 110 further includes a float 116, a float lifting-up mechanism 118, and a mechanism operation detection sensor 1181.

The float 116 is disposed inside the tubular shape of the blowout prevention device 110 and floats on the liquid (the beer in the present embodiment) 20 flowing into the blowout prevention device 110, and moves up and down according to the amount of liquid in the blowout prevention device 110. Furthermore, when the liquid 20 in the storage container 10 is gone, pressurized gas (above-described carbon dioxide in the present embodiment) flows from the liquid inlet 111 into the blowout prevention device 110, and the liquid level is depressed, and, with this, the float 116 goes down. Then, immediately before the pressurized gas flown into the blowout prevention device 110 is discharged from the liquid outlet 112, specifically, an inflow entrance 112*a* of the liquid outlet 112, the float 116 is fitted into the inflow entrance 112*a* and closes the liquid outlet 112. It is noted that an O-ring 1161 as an example of a sealing member is provided on a portion of the float 116 fitted into the inflow entrance 112*a* to ensure the sealability when it is fitted.

Such an operation of the float 116 prevents pressurized gas from entering the side of the dispensing device 50 from the liquid outlet 112, and prevents the pressurized gas from blowing out from the liquid outlet 54 when beer in the beer keg 10 has run out. Furthermore, the blowout prevention device 110 performs the mechanical blocking operation using the float 116 in this way; therefore, it allows for a relatively simple configuration without electrical treatment.

The float lifting-up mechanism 118 is a mechanism that mechanically lifts up the float 116 fitted into the inflow entrance 112*a* through manipulation of a lever 118*a* and forcibly detaches the float 116 from the inflow entrance 112*a*. Furthermore, in the present embodiment, the float lifting-up mechanism 118 includes the mechanism operation detection sensor 1181 that detects the operation of the float lifting-up mechanism, i.e., detects that the float 116 is detached through manipulation of the lever 118*a*. And, in the present embodiment, the mechanism operation detection sensor 1181 is electrically connected to the transmission device 130.

The float lifting-up mechanism 118 having such a configuration is manipulated after the storage container 10 becomes empty and liquid is filled into the internal volume V after replacement with a new storage container 10, and is also manipulated when cleaning of the inside of the pipe in the liquid supply system 101 is performed. Therefore, by detecting the operation of the float lifting-up mechanism, it becomes possible to provide above-described information that cleaning of the inside of the pipe is done.

Moreover, the blowout prevention device 110 includes, in its upper part, a gas discharge mechanism 113 that discharges pressurized gas (in the embodiment, carbon dioxide) flown into the blowout prevention device 110 to the outside of the blowout prevention device 110, and further includes a visual recognition section 114 that is provided at least on a portion adjacent to the gas discharge mechanism 113 and through which the inside of the blowout prevention device 110 can be seen.

In the present embodiment, the gas discharge mechanism 113 includes a discharge port 113*a* and an air vent lever 113*b* for gas discharge manipulation to open and close the discharge port 113*a*. It is noted that the operational function of the gas discharge mechanism 113 will be described later. Furthermore, in the present embodiment, the blowout prevention device 110 is formed into a transparent cylindrical body except for its upper and lower parts, and the visual recognition section 114 is formed over substantially the entire length thereof.

Next, the liquid absence detection device 120 is described.

The liquid absence detection device 120 is a device that is installed between the storage container 10 and the blowout prevention device 110 or in the blowout prevention device

Figure 3:
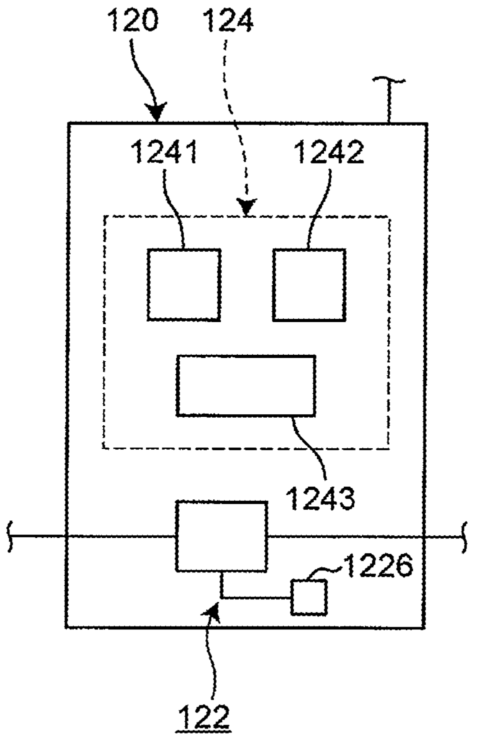
FIG. 3 is a block diagram showing a schematic configuration of a liquid absence detection device shown in FIG. 1.

110, and, as shown in FIG. 3, includes a no-liquid/liquid passage sensor 122 and a liquid-state determination unit 1226 which are provided to detect that liquid in the storage container 10 has run out, and detects that the liquid 20 in the storage container 10 has run out.

Furthermore, the liquid absence detection device 120 includes a nullification device 124, and the nullification device 124 includes a cleaning switch 1241, a flow-rate acquisition unit 1242, and a cancellation unit 1243, specifically, includes at least either the cleaning switch 1241 or the flow-rate acquisition unit 1242 and the cancellation unit 1243.

These components of the liquid absence detection device 120 are described in detail below.

Figure 4A:
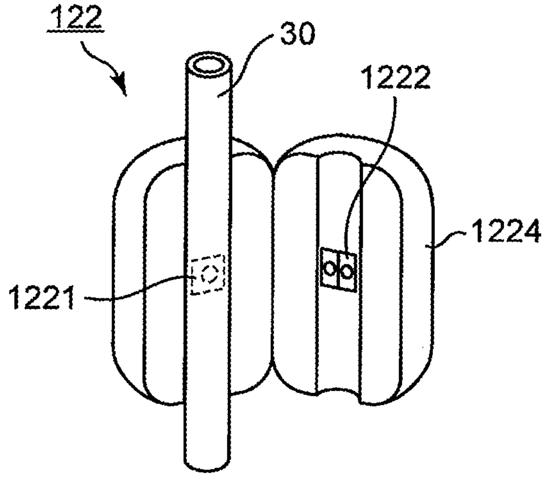
FIG. 4A is a perspective view showing a schematic configuration of the liquid absence detection device shown in FIG. 1.
Figure 4B:
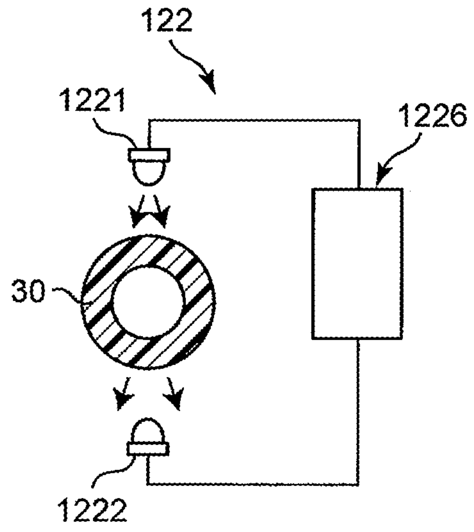
FIG. 4B is a diagram showing a schematic configuration and an operation of the liquid absence detection device shown in FIG. 1.

As shown in FIGS. 4A and 4B as an example, the no-liquid/liquid passage sensor 122 includes a light emitting element 1221 and a light receiving element 1222. As an example, in the present embodiment, the light emitting element 1221 and the light receiving element 1222 are arranged to face each other across beer passing through the supply tube 30 in a housing 1224 provided so as to hold the resin supply tube 30 connected to the outlet of the storage container 10. The light emitting element 1221 emits infrared light, and the light receiving element 1222 receives the emitted infrared light. The light emitting element 1221 and the light receiving element 1222 perform control of light emission and light receiving, and are electrically connected to the liquid-state determination unit 1226 that detects the state of passing liquid (beer) 20. That is, light that travels from the light emitting element 1221 to the light receiving element 1222 differs in the refractive index depending on which of liquid, gas, or a mixture of the two an object passing through the supply tube 30 is. Therefore, the amount of light received by the light receiving element 1222 varies depending on the object passing through the supply tube 30. The liquid-state determination unit 1226 detects the variation in the amount of received light and determines that the passing object is gas. The liquid-state determination unit 1226 is electrically connected to the transmission device 130 described below.

The installation location of the no-liquid/liquid passage sensor 122 is not limited to the supply tube 30 described above, and may be installed, for example, in the blowout prevention device 110. That is, for example, in a case where the light emitting element and the light receiving element are used by utilizing the fact that the float 116 moves up and down according to the amount of liquid in the blowout prevention device 110, the light emitting element and the light receiving element may be disposed in positions in the upper part of the blowout prevention device 110 where the float 116 is located in FIG. 2 as an example. In this form, no-liquid/liquid passage can be detected by a change in the amount of received light according to the reflection of light (a reflected light method) or the blocking of light (a transmitted light method) by the float 116. Alternatively, a capacitance sensor (an electrode sheet) may be disposed on a wall surface of the blowout prevention device 110 along the vertical direction. In this form, no-liquid/liquid passage can be detected by a change in the capacitance according to the water level of the liquid 20 in the blowout prevention device 110.

The nullification device 124 is a device that nullifies storage container empty information generated by the liquid absence detection device 120, specifically, the liquid-state determination unit 1226 through cleaning of the inside of the pipe in the liquid supply system 101. That is, as described above, the liquid-state determination unit 1226 electrically connected to the no-liquid/liquid passage sensor 122 detects that the liquid 20 in the storage container 10 has run out, i.e., the storage container 10 has become empty by a difference in the refractive index of an object passing through the supply tube 30. Meanwhile, also when the inside of the pipe in the liquid supply system 101 is cleaned, air and cleaning water flow through the supply tube 30, and this is why the liquid absence detection device 120, specifically, the liquid-state determination unit 1226 determines that the storage container 10 is empty.

Therefore, the nullification device 124 is a device that nullifies storage container empty information generated through cleaning of the inside of the pipe in such a liquid supply system 101.

As an example of a means to enable, i.e., activate the nullification device 124, in the present embodiment, the cleaning switch 1241 or the flow-rate acquisition unit 1242 can be used.

The cleaning switch 1241 is a switch that can be manipulated when above-described cleaning of the inside of the pipe is performed; a dedicated switch may be provided, or it can be shared, for example, by the mechanism operation detection sensor 1181 of the blowout prevention device 110.

The flow-rate acquisition unit 1242 is a component that determines the flow rate of the liquid 20 dispensed from the storage container 10, and includes, as an example, a flow rate sensor and a flow rate creation unit. The flow rate sensor can be installed so as to hold the supply tube 30, and, for example, an ultrasonic sensor can be used. Furthermore, the flow rate creation unit is configured to determine the flow rate of the liquid 20 on the basis of a signal obtained from the flow rate sensor.

Through manipulation of the cleaning switch 1241, the cancellation unit 1243 nullifies the storage container empty information generated through cleaning of the inside of the pipe, or, in a case where the total value of the flow rate of the liquid 20 flown out from the storage container 10 that has been determined by the flow-rate acquisition unit 1242 is less than the capacity of the storage container 10, nullifies the storage container empty information generated through cleaning of the inside of the pipe.

In this way, the nullification device 124 can nullify pseudo storage container empty information.

Next, the transmission device 130 is described.

The transmission device 130 is electrically connected at least to the liquid absence detection device 120, and includes a control unit 131 that performs control of information transmission to the communication line 200.

Furthermore, as in the present embodiment, the transmission device 130 may be further electrically connected to the blowout prevention device 110, specifically, to the mechanism operation detection sensor 1181 of the float lifting-up mechanism 118.

Therefore, such a transmission device 130 transmits storage container empty information obtained from the liquid absence detection device 120, in other words, information about replacement of the beer keg 10 and information that cleaning of the inside of the pipe in the liquid supply system 101 is done, and further information that cleaning of the inside of the pipe is done obtained from the blowout prevention device 110 from the control unit 131 to, for example, the host computer 300 of a beer brewery, through the communication line 200. At this time, the control unit 131 can also transmit time information about the year, month, day, hour, minute, and second generated by the control unit 131 together.

Furthermore, each of the liquid-state determination unit 1226, the flow-rate acquisition unit 1242 and the cancellation unit 1243 of the nullification device 124 in the liquid absence detection device 120 and the control unit 131 in the transmission device 130 that have been described above is actually made up of a computer such as a microprocessor. The computer includes software that performs the above-described function of each component and hardware such as a CPU that executes the software and a memory.

The operation of the liquid supply system 101 having the above configuration is described below.

Figure 5:
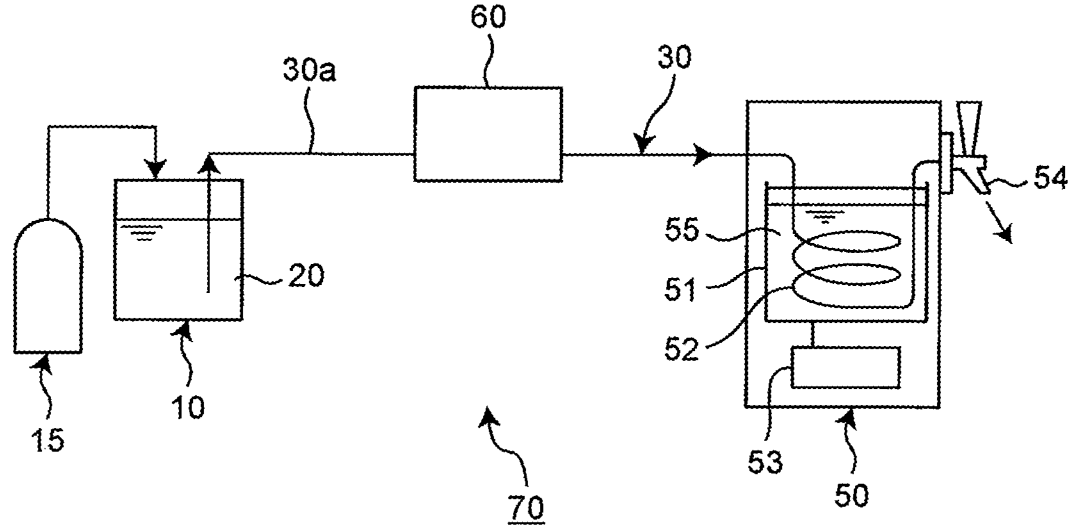
FIG. 5 is a diagram showing a configuration example of a conventional liquid supply system.

The basic operation of the liquid supply system 101 is similar to the operation of the liquid supply system 70 shown in FIG. 5. That is, the liquid (the beer) 20 in the storage container 10 is fed into the dispensing device 50 through the blowout prevention device 110 with pressurized gas (carbon dioxide) of the pressurization source 15, and is cooled and, through manipulation of the lever 56, on the liquid outlet 54, dispensed from the liquid outlet 54 into the drinking vessel 40. At this time, the liquid absence detection device 120 detects that an object flowing through the supply tube 30 is the liquid (the beer) 20.

The blowout prevention device 110 in the liquid supply system 101 operates as follows. It is noted that normally, the discharge port 113*a* is closed by manipulation of the air vent lever 113*b*.

As described above, when the liquid (the beer) 20 is normally pressure-fed from the storage container 10 to the liquid outlet 54 of the dispensing device 50, the inside of the blowout prevention device 110 is in a state of being filled with the liquid 20 flown in from the liquid inlet 111 and discharged from the liquid outlet 112, thus, the float 116 floats on the liquid 20, and, in this state, the liquid 20 flows.

Meanwhile, in a case where the liquid 20 in the storage container 10 has run out while it is dispensed from the liquid outlet 54, the liquid 20 containing bubbles is conveyed through the supply tube 30. Therefore, as described above, the liquid absence detection device 120 detects a difference in the refractive index of a substance passing through the supply tube 30, and detects that the liquid 20 in the storage container 10 has run out, and transmits this storage container empty information to the transmission device 130.

The control unit 131 of the transmission device 130 transmits the storage container empty information sent by the liquid absence detection device 120 to the host computer 300 via the communication line 200.

Therefore, for example, a beer brewery having the host computer 300 can recognize the date and time when the storage container 10 has been replaced with respect to each shop. Consequently, for example, the beer brewery can recognize whether or not the liquid 20 in the storage container 10 has been consumed within a prescribed number of days with respect to each shop, and can control the quality of the liquid 20 in view of the fact that the number of consumption days affects the quality of the liquid 20 to be provided.

Furthermore, the liquid 20 containing bubbles or the pressurized gas (carbon dioxide) further reaches the blowout prevention device 110, and forces the liquid 20 filled in the blowout prevention device 110 out from the liquid outlet 112 toward the supply tube 30 on the side of the dispensing device 50. Therefore, with decrease in the amount of liquid in the blowout prevention device 110, the float 116 goes down, and is fitted into the inflow entrance 112*a* of the liquid outlet 112 on the blowout prevention device 110 and closes the liquid outlet 112.

In this way, the blowout prevention device 110 can prevent pressurized gas from blowing out from the liquid outlet 54 when beer in the beer keg 10 has run out.

Furthermore, in fact, by putting the blowout prevention device 110 in operation, it becomes possible for the shop staff to recognize that beer in the beer keg 10 has run out and replace the empty storage container 10 with a new storage container 10 filled with liquid 20.

After the replacement of the storage container 10, the liquid 20 in the new storage container 10 is introduced into the supply tube 30, and begins to be pressure-fed. At this time, the float 116 in the blowout prevention device 110 still remains in a state of being fitted into the inflow entrance 112*a* of the liquid outlet 112. Therefore, at the time of introduction of liquid, gas (carbon dioxide) present in the blowout prevention device 110 has to be removed, and to do so, the shop staff manipulates the air vent lever 113*b* of the blowout prevention device 110 and opens the discharge port 113*a*. Through this manipulation, the gas retaining in the upper part of the blowout prevention device 110 and further the liquid 20 containing bubbles are discharged from the discharge port 113*a* to the outside of the blowout prevention device 110, thereby the inside of the blowout prevention device 110 is filled with the liquid 20 from the new storage container 10.

In the present embodiment, such a gas discharge manipulation is performed by a staff member's visual observation through the visual recognition section 114 disposed adjacent to the gas discharge mechanism 113 of the blowout prevention device 110.

Then, at the point of time when the internal volume V of the blowout prevention device 110 has been filled with the liquid 20, the air vent lever 113*b* is manipulated to close the discharge port 113*a*. Next, the staff member manipulates the lever 118*a* on the float lifting-up mechanism 118 of the blowout prevention device 110 to mechanically lift up the float 116 fitted into the inflow entrance 112*a* and forcibly detaches the float 116 from the inflow entrance 112*a*. Thus, the float 116 rises to the surface of the liquid. Furthermore, the inflow entrance 112*a* is opened and connected to the liquid outlet 112.

With this, the liquid supply system 101 returns to the normal operation.

After this, through manipulation to open the lever 56 of the liquid outlet 54, the liquid 20 passes through the blowout prevention device 110 and flows to the side of the dispensing device 50.

The above is the normal operation to supply the liquid 20; meanwhile, when cleaning of the inside of the pipe in the liquid supply system 101 is performed, the liquid supply system 101 operates as follows.

In the liquid supply system 101 of the present embodiment, the blowout prevention device 110 has a different size from the inner diameter of the supply tube 30, etc., and therefore, so-called sponge-cleaning cannot be performed over the entire pipe of the liquid supply system 101. Therefore, as the cleaning operation, cleaning with a chemical solution is performed. In principle, this cleaning is performed at each closing time the shop is closed, and the storage container 10 is replaced with a cleaning solution tank filled with a cleaning solution (an undiluted chemical solution or a chemical solution diluted with tap water), and the cleaning solution is pressure-fed with carbon dioxide, and the inside of the supply tube 30 and the inside of the pipe up to the liquid outlet 54 of the dispensing device 50 (the beer dispenser 50) are cleaned with running water.

It is noted that after the cleaning operation, the cleaning solution inside the pipe is purged with carbon dioxide. Furthermore, before the shop is open, the storage container 10 is again set, and liquid 20 is filled (called) into the supply tube 30 and the pipe of the dispensing device 50 from the storage container 10 to prepare for the shop to open.

At the start of such a cleaning operation, the shop staff manipulates the cleaning switch 1241 of the liquid absence detection device 120, thereby secondarily generated "cleaning done" information is sent from the liquid absence detection device 120 to the transmission device 130, and the transmission device 130 transmits the "cleaning done" information to the communication line 200. Alternatively, through manipulation of the lever 118*a* on the float lifting-up mechanism 118 of the blowout prevention device 110, "cleaning done" information is sent from the blowout prevention device 110 to the transmission device 130 through the mechanism operation detection sensor 1181, and the transmission device 130 can transmit the "cleaning done" information to the communication line 200.

As described above, according to the liquid supply system 101 of the present embodiment, it is possible for, for example, a beer brewery having the host computer 300 to recognize, with respect to each shop, whether or not the shop has performed the cleaning operation as prescribed in the guidance. Therefore, in view of the fact that the presence or absence of the cleaning operation is associated with the quality of liquid 20 to be provided, it is possible to control the quality of the liquid 20 to be provided.

It is noted that after a lapse of some time after the cleaning operation, for the above-described operation of filling (calling) the liquid 20, manipulation of the lever 118*a* of the blowout prevention device 110 is performed once again, and "cleaning done" information is transmitted. However, the information can be processed by software on the host computer 300 side using, for example, the lapse time, etc. and can be canceled.

As described above, according to the liquid supply system 101 of the present embodiment, at least the storage container empty information and the cleaning done information that are sent from the liquid absence detection device 120 are transmitted from the transmission device 130, which allows for management of the "freshness" of liquid (for example, beer) 20 and management of the "cleanliness of the pipe" of the liquid supply system 101; therefore, it is possible to control the quality of the liquid 20 to be provided.

It is noted that, by appropriately combining arbitrary embodiments of the above-described various embodiments, it becomes possible to achieve the respective effects of the embodiments.

The present invention has been fully described in association with preferred embodiments with reference to the accompanying drawings, yet various modifications and alterations will be obvious to those skilled in the art. It should be understood that such modifications and alterations may occur insofar as they are within the scope of the present invention described in the appended claims.

This application claims the benefit of Japanese Patent Application 2020-167092 filed on Oct. 1, 2020, the entire contents of the specification, drawings, claims, and abstract are incorporated herein by reference.

INDUSTRIAL APPLICABILITY

The present invention is applicable to a liquid supply system that pressure-feeds liquid in a storage container and dispenses the liquid from a dispensing device into a drinking vessel.

DESCRIPTION OF REFERENCE SYMBOLS

10 STORAGE CONTAINER
20 LIQUID
30 SUPPLY TUBE
40 DRINKING VESSEL
50 DISPENSING DEVICE
54 LIQUID OUTLET
70 LIQUID SUPPLY SYSTEM
101 LIQUID SUPPLY SYSTEM
110 BLOWOUT PREVENTION DEVICE
111 LIQUID INLET
112 LIQUID OUTLET
116 FLOAT
118 FLOAT LIFTING-UP MECHANISM
1181 MECHANISM OPERATION DETECTION SENSOR
120 LIQUID ABSENCE DETECTION DEVICE
122 NO-LIQUID/LIQUID PASSAGE SENSOR
124 NULLIFICATION DEVICE
1241 CLEANING SWITCH
1242 FLOW-RATE ACQUISITION UNIT
1243 CANCELLATION UNIT
130 TRANSMISSION DEVICE
131 CONTROL UNIT
200 COMMUNICATION LINE

The invention claimed is:

1. A liquid supply system that supplies liquid, using pressurized gas, from a storage container to a dispensing device through a supply tube and dispenses the liquid from a liquid outlet of the dispensing device into a drinking vessel, the liquid supply system comprising:
- a blowout prevention device that is installed in the supply tube, the blowout prevention device including
  - a liquid inlet connected to the supply tube,
  - a liquid outlet connected to the supply tube, and
  - a float configured to fit in and close the liquid outlet by an inflow of gas from the liquid inlet and thereby prevent the pressurized gas from blowing out from the liquid outlet,
  - the blowout prevention device providing information indicative of that a cleaning of an inside of a pipe in the liquid supply system has been done;
- a liquid absence detection device that is installed between the storage container and the blowout prevention device or in the blowout prevention device, the liquid absence detection device including a no-liquid/liquid passage sensor that detects that liquid in the storage container has run out and sends storage container empty information; and
- a transmission device that is electrically connected to the liquid absence detection device, and includes a control unit that performs control of information transmission to a communication line,
- wherein the liquid absence detection device includes a nullification device that nullifies the storage container empty information generated when the cleaning of the inside of the pipe in the liquid supply system is done.

2. The liquid supply system according to claim 1, wherein the nullification device
- includes
  - a cleaning switch that is manipulated at the cleaning of the inside of the pipe in the liquid supply system or
  - a flow-rate acquisition unit that determines a flow rate of the liquid dispensed from the storage container, and
- further includes a cancellation unit that
  - nullifies the storage container empty information generated through the cleaning of the inside of the pipe through manipulation of the cleaning switch, or
  - if a total value of the flow rate determined is less than a capacity of the storage container, nullifies the storage container empty information generated through the cleaning of the inside of the pipe.

3. The liquid supply system according to claim 1, wherein the blowout prevention device includes:
- a float lifting-up mechanism that forcibly detaches the float fitted into the liquid outlet from the liquid outlet; and
- a mechanism operation detection sensor that is electrically connected to the transmission device and detects an operation of the float lifting-up mechanism.

4. The liquid supply system according to claim 1, wherein the control unit is further electrically connected to the blowout prevention device in addition to the liquid absence detection device, and performs a transmission of the storage container empty information from the liquid absence detection device and a transmission of the information from the blowout prevention device, indicative of that the cleaning of the inside of the pipe has been done.

* * * * *